United States Patent [19]

Mellor

[11] Patent Number: 4,854,670

[45] Date of Patent: Aug. 8, 1989

[54] WIDE ANGLE OPTICAL FILTERS

[75] Inventor: Charles E. Mellor, Salem, Mass.

[73] Assignee: GTE Products Corporation, Danvers, Mass.

[21] Appl. No.: 178,790

[22] Filed: Mar. 29, 1988

Related U.S. Application Data

[63] Continuation-in-part of Ser. No. 943,274, Dec. 17, 1986, abandoned.

[51] Int. Cl.⁴ .................... G02C 5/22; G02C 5/28
[52] U.S. Cl. ................................ 350/166; 350/1.6
[58] Field of Search .................. 350/1.6, 1.7, 164, 166

[56] References Cited

U.S. PATENT DOCUMENTS 2,412,496 12/1946 Dimmick .
4,461,532 7/1984 Sato et al. ........................ 350/1.6
4,504,109 3/1985 Taga et al. ........................ 350/166
4,556,599 12/1985 Sato et al. ........................ 350/166

Primary Examiner—John K. Corbin
Assistant Examiner—Jay Ryan
Attorney, Agent, or Firm—Joseph S. Romanow

[57] ABSTRACT

A thin-film optical interference filter designed and manufactured to have high transmission of blue light and high reflectance of infrared light. The novel feature of this filter rests in the thin-film layer design at the top and bottom of a quarterwave stack and the manufacturing technique by which this thin-film design is deposited. The thin-film layer design suppresses the so called halfwave holes which occur at wide angles of incidence of the incoming light. This desirable effect is achieved by the proper layer thickness and refractive index control in the manufacturing process.

7 Claims, 3 Drawing Sheets

WIDE ANGLE OPTICAL FILTERS

STATEMENT OF GOVERNMENT INTEREST

The Government of the United States of America has certain rights in this invention pursuant to Contract No. N00039-84-C0643, Subcontract SD03-01531, with the United States Navy. p This is a continuation-in-part of Ser. No. 943,274, filed Dec. 17, 1986, assigned to the assignee hereof now abandoned.

BACKGROUND OF THE INVENTION

The present invention is directed to a thin-film optical interference filter designed and manufactured to have high-transmittance of blue light and high reflectance of infrared light.

Optical interference filters of the long-wave pass and short-wave pass types are normally based upon quarterwave stacks. See, for example, H. A. Macleod, "Thin-film Optical Filters," American Elsevier, N.Y. (1969).

A quarterwave stack generally consists of alternating layers or "series" of high-reflectance materials and low-reflectance materials. See, for example, A. Thelen, "Equivalent Layers in Multilayer Filters," *J. Opt. Soc. Am.*. 50:1533-1538 (1966). See also U.S. Pat. No. 2,412,496, issued Dec. 10, 1946, to Dimmick.

One problem typically encountered in the use of optical filters based upon quarterwave stacks is known as a "halfwave hole." The halfwave holes appear as dips or minima in the transmittance curve, occurring especially at incident angles approaching 50°. See, H. A. Macleod, "Performance Limiting Factors in Optical Coatings," Proceedings of the Los Alamos Conference on Optics, '81, D. H. Liebenberg, ed., SPIE, 288:580-586 (1981).

The nature of the halfwave holes is such that monitoring errors, which cause departure from the strict halfwave thickness of the layers, invariably lead to transmittance dips in the transmission band. No satisfactory compensation for wide-angle filters has been discovered for this error, which must be kept as small as possible.

Another cause of a halfwave hole is layer dispersion. A layer which appears as a quarterwave at 900 nm does not necessarily appear as a halfwave at 450 nm. This is due to the fact that the film's refractive index may increase at shorter wavelengths. Since the variation in refractive index is generally less for low-index layers, this variation causes a distinction between the wavelength for which the high-index layers are halfwaves from that for which the low-index layers are halfwaves. Thus, the high-and low-index layers are not halfwaves at the same wavelength, and a "hole" appears.

One approach to solving the "halfwave hole" problem includes ensuring that, in spite of dispersion, the layers are halfwaves at precisely the same wavelengths. This approach strives to eliminate thickness errors as far as possible. An optical interference filter incorporating these corrections was disclosed in a report entitled "SLC Cesium Atomic Resonance Filter Interference Coatings," by H. A. Macleod et al., Final Report for Navy Contract No. N66001-82K-0187 (September 1983).

The present invention provides an alternate solution to the halfwave hole phenomenon.

SUMMARY OF THE INVENTION

The present invention is directed to a thin-film optical interference filter which provides a high-transmission of blue light and high-reflectance of infrared light.

The unique features of this filter rest in the thin-film layer design and the manufacturing technique by which this film is deposited.

The thin-film layer of the present invention suppresses the halfwave hole problem which occurs at wide angles of incidence of the incoming light. This desirable result is achieved by a combination of the proper layer thicknesses and refractive-index control in the manufacturing process.

The novel coating design and fabrication method of the present invention is described in the detailed description which follows, infra.

BRIEF DESCRIPTION OF THE FIGURES

In FIGS. 1 and 2, the reflectance at 0 and 53 degrees angle of incidence respectively, is illustrated for the filter of the present invention.

DETAILED DESCRIPTION OF THE PREFERRED EMBODIMENTS

A filter in accordance with the invention is designed in part to reflect infrared light or wavelengths in the range of approximately 850–900 nm at angles of incidence of 0° to approximately 55°. Accordingly, the design wavelength, to which the term "quarterwave" pertains, is approximately 880 nm. The abbreviation "nm" is used herein to denote a nanometer which is one billionth of a meter or ten Angstroms.

Figure 5:
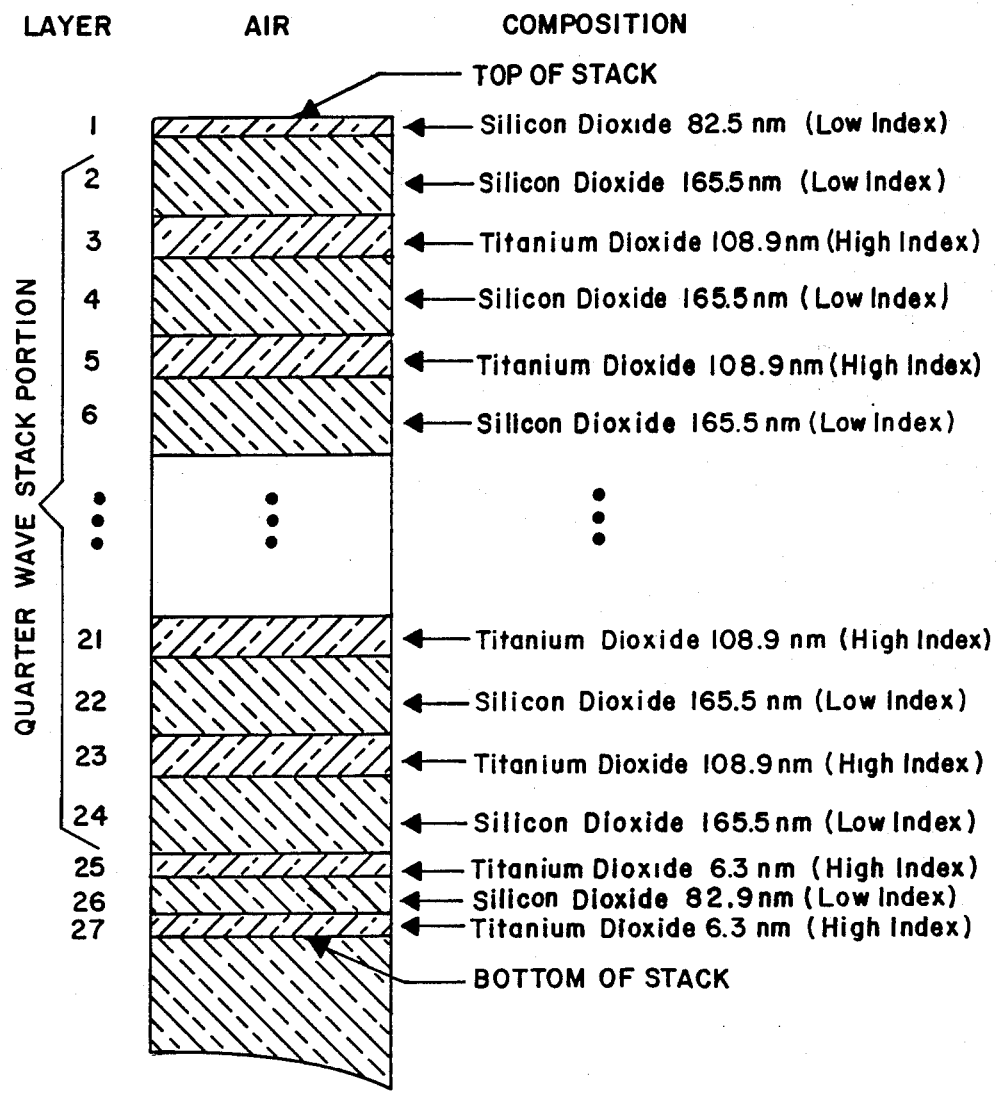
FIG. 5 is an enlarged cross-sectional view of a thin-film optical interference filter in accordance with the invention.

The quarterwave stack portion of this design, for example, layers 2–24, inclusive, of FIG. 5, is known in the art of interference coating technology. The new features of the stack of the present invention are the layers at the top and bottom of the stack, e.g., layer 1 in FIG. 5 at the top and layers 25–27 in FIG. 5 at the bottom, as well as the novel method of fabricating the filter.

Figure 1:
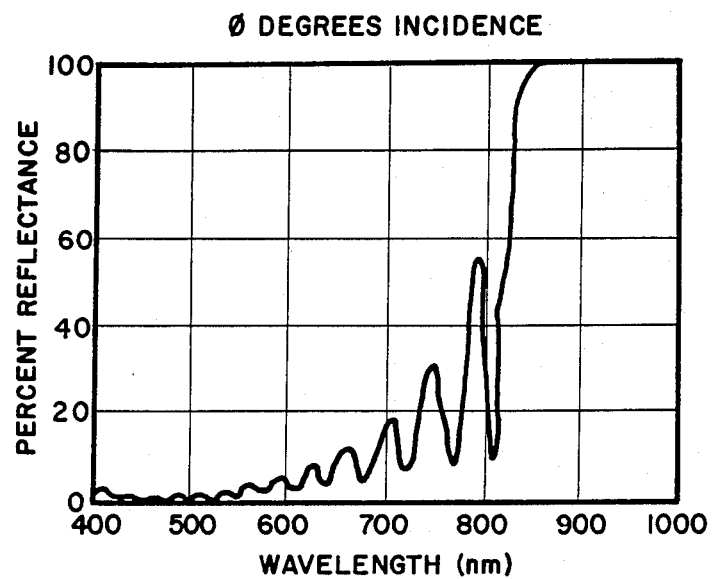
FIGS. 1 and 2 represent the computed reflectance of the thin-film interference filter of the present invention, in contrast to the computed reflectance of a typical quarterwave stack of the prior art shown in FIGS. 3 and 4. In each figure, the percent reflectance is shown versus wavelength, where reflectance is the percentage of light not transmitted through the filter.
Figure 2:
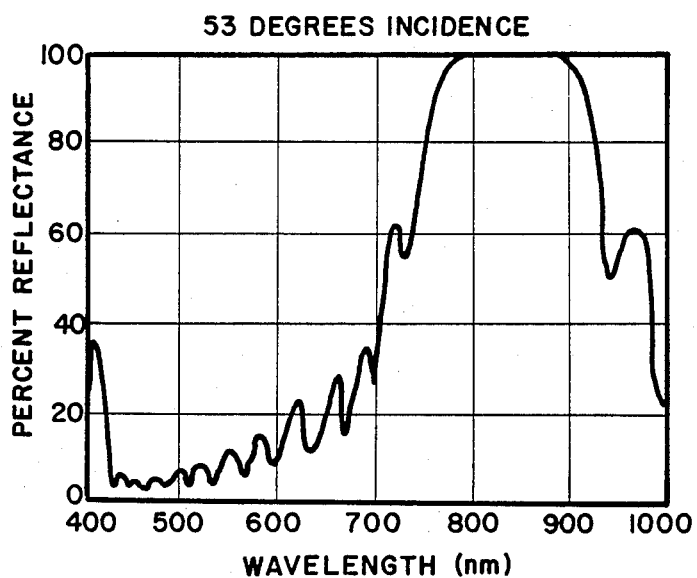
Figure 3:
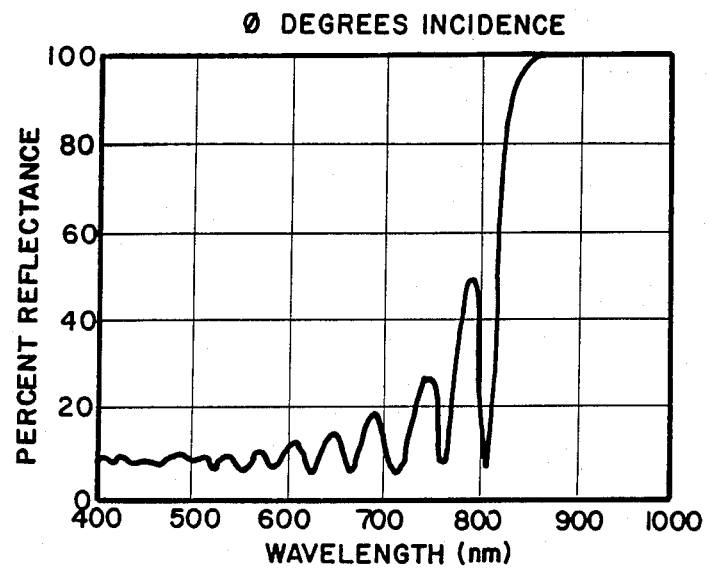
In FIGS. 3 and 4, the reflectance at 0 and 53 degrees angle of incidence respectively, is illustrated for a typical quarterwave stack from the prior art.
Figure 4:
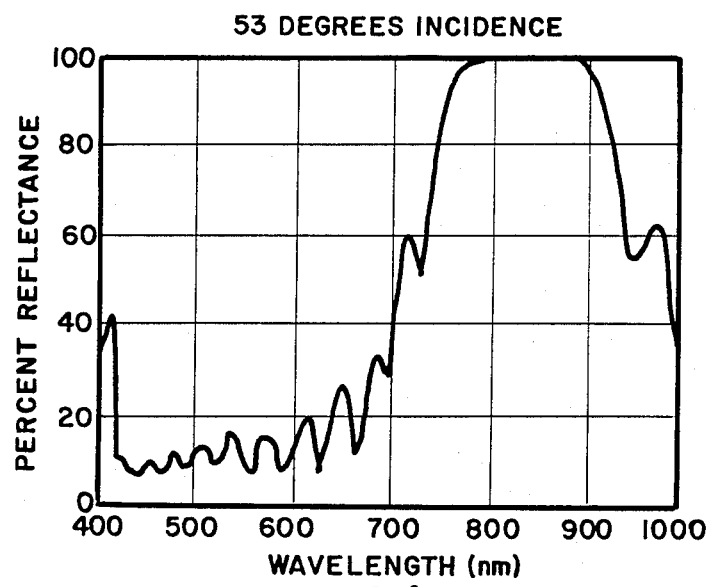

FIGS. 1 and 2 represent the computed reflectance of a preferred thin-film interference filter of the present invention. FIGS. 3 and 4 represent the computed reflectance of a typical quarterwave stack from the prior art. FIGS. 1 and 3 are based on the model that the incident light is normal to the filter. In FIGS. 2 and 4, the light approaches the filter at an angle of incidence of 53 degrees from the normal. As may be seen from comparisons of FIGS. 1 and 3 and FIGS. 2 and 4, respectively, the percentage reflectance of the invention is substantially less than that of the prior art for light having wavelengths ranging between approximately 430 to approximately 480 nm which may be characterized herein as blue light.

In a thin-film optical filter in accordance with the invention, approximately 95% or more of blue light passes through the filter, whereas comparable quarter-wave optical filters of the prior art typically transmit a maximum of 85% of blue light. The blue-light transmittance advantage of the invention improves with greater angles of incidence of the incoming light up to approximately 55 degrees angle of incidence. The ability to transmit a high percentage of blue light at wide angles is advantageous in various applications including pre-filtering of atomic resonance communications devices. Using this new design and the manufacturing process described below to prepare same, a cost effective system for manufacturing wide-band optical filters, especially useful in undersea communications devices, has been achieved.

The manufacture of a filter in accordance with the invention may be conducted using a low-refractive index material, preferably silicon dioxide, and a high-refractive index material, preferably titanium dioxide. The layers are deposited, for example, by a known electron beam evaporation technique in a high-vacuum coating machine with planetary substrate tooling. Other conventional deposition techniques may be employed, but electron beam evaporation is the preferred method. For purposes herein, an index of refraction will be characterized as being "low" if it is less than or equal to 1.6; as "intermediate," if greater than 1.6 and less than 1.9; and as "high," if greater than or equal to 1.9, for filters designed to operate in the visible and near-infrared spectra.

During the coating process, an ample supply of oxygen is maintained within the coating machine. This insures that the vaporized titanium monoxide will combine with oxygen and condense into a titanium dioxide layer. During deposition, the substrate is maintained at an elevated temperature, e.g., at or above 200° C.

It is known that the refractive index of titanium dioxide is affected by the partial pressure of oxygen, the total pressure in the coating machine, and the rate of deposition; so that by careful monitoring of these parameters during the deposition process, reproducible control of the index of refraction for each layer may be achieved.

Filter size is not a constraint, so long as the physical orientation of the evaporation sources to the substrate is maintained and the coating machine is well instrumented so that proper coating conditions are maintained.

The fabrication of the optical coating is performed by applying successive layers commencing at the substrate at the "bottom" of the stack and ending at the "top" of the stack; see, for example, FIG. 5. The top two layers (preferably both of silicon dioxide), i.e., layers 1 and 2 of FIG. 5, are produced by interrupting the deposition process, so that two layers of the same low-refractive index material are created. This may be accomplished, for example, by stopping deposition, allowing the substrate to cool, e.g., to about 100° C., and then resuming deposition. The interruption is preferably conducted for only a short period, for example, for about 5 minutes. This creates an optical boundary defining the two adjacent layers of silicon dioxide. At this boundary, optical light interference occurs which minimizes reflection and maximizes transmission of blue light through the filter. Experimental results show that layer 1 should have a thickness of approximately 25% to approximately 67% of the thickness of layer 2 in order to observe improved transmission of blue light through the filter. Note, layer 2 is the top most layer of the quarterwave stack (see FIG. 5).

The gist of the novel method of fabrication of a thin-film optical filter is as follows. An optical boundary is formed between two adjacent layers of the same coating material by applying a first coating on the substrate (or on another coating of the filter) at a first temperature and then applying a second coating of the same material on the first coating at a second temperature. In practice, this involves four steps as follows: (a) heating or cooling the substrate to a first temperature; (b) applying the first coating of material at a first temperature to attain a first coating thickness; (c) heating or cooling the substrate to a second temperature; and (d) applying the second coating of the same material at a second temperature to attain a second coating thickness. It is not critical whether the second deposition temperature is greater or less than the first deposition temperature as long as the two deposition temperatures are different. Because the two adjacent coatings are applied at different deposition temperatures, the respective densities and refractive indices of the two coatings are also different, notwithstanding the fact that the two coatings are of the same material, whereby an "optical boundary" between the coatings has been defined. In the preferred embodiment described herein, the second deposition temperature is cooler than the first temperature so that step (c) is accomplished simply by interrupting the coating process for a period sufficient to allow the substrate to cool to the second deposition temperature. As will be seen, other deposition parameters, such as the deposition pressure and deposition rate, may be varied between the application of the two coatings; however, it is believed that deposition temperature is the critical control parameter.

In a preferred embodiment of the present invention employing silicon dioxide in the top two stack layers, layer 1 has an index of refraction of approximately 1.43 and layer 2 has an index of refraction of approximately 1.48. Thus, layer 1 is believed to act in combination with layer 2 to minimize reflectance of blue light in a way analogous to that of an ideal decreasing graded index layer.

The three layers at the bottom of the stack, i.e., layers 25-27 of FIG. 5, provide an optical interface between the substrate and quarterwave stack which minimizes reflectance of blue light particularly at higher angles of incidence up to approximately 55 degrees. Layers 25-27 of FIG. 5 comprise a layer of a low-refractive index material, such as silicon dioxide, sandwiched between two substantially thinner layers of a high-refractive index material, such as titanium dioxide. Experimentation has demonstrated that this combination of layer materials and thicknesses at the bottom of the stack maximizes the ability of the filter to transmit blue light at high angles of incidence.

In laboratory examples, the thicknesses of layers 25 and 27 were varied from approximately 1/64 to 1/32 of the design wavelength. All examples demonstrated beneficial results, i.e., improved transmission of blue light through the filter. There is no requirement that layers 25 and 27 have equal thicknesses. It is believed that a layer or layers thinner than 1/64 of the design wavelength would provide beneficial results provided uniform layer thickness can be effectively fabricated. Observations indicate that benefits diminished rapidly when the layer thickness exceeded 1/32 of the design wavelength.

In the laboratory examples investigated, the middle layer, i.e., layer 26 of FIG. 5, had a thickness of one-eighth of the design wavelength, plus or minus ten percent of one-eighth of the design wavelength. In all cases, the benefits of the invention were observed as reported.

Laboratory examples further demonstrate that the benefits of the invention are enhanced when the invention includes the combination of the top-most layer of the stack, the three layers at the bottom of the stack, and the intermediate quarterwave stack; this combination is the preferred embodiment described herein. However, substantial benefits may be obtained by employing the three layers at the bottom of the stack and the quarterwave stack without the layer above the quarterwave stack.

The present invention will be further illustrated with reference to the following example which aids in its understanding, but which is not to be construed as a limitation thereof.

WORKING EXAMPLE

Manufacture of the preferred filter of the present invention was conducted using silicon dioxide as the low-refractive index material, $N_L = 1.48$, and titanium dioxide as the high-refractive index material, $N_H = 1.9$ to 2.3, where N is the index of refraction.

The layers were deposited by electron beam evaporation in a high-vacuum coating machine with planetary tooling. During evaporation, oxygen was introduced into the system so that titanium dioxide was formed by oxidation of vaporized titanium monoxide.

The substrate temperature was maintained at about 200° C. throughout the deposition of the quarterwave stack. The substrate material was borosilicate glass.

The top two stack layers of silicon dioxide were produced by interrupting the deposition, so that two layers of the same material with an optical boundary therebetween were created. This was accomplished by stopping the deposition process, allowing the system to cool from 200° C. to about 100° C., and then resuming deposition. The interruption was conducted for about 5 minutes. This created the desired optical boundary. The refractive index of layer 2 of silicon dioxide was approximately 1.48, and the refractive index of the layer 1 of silicon dioxide was approximately 1.43.

The layers of the preferred optical filter of the present invention and their respective coating parameters are set forth in Table I below. In this Table, "N" is the index of refraction. "D" is coating thickness. "D (monitor)" is the coating thickness on an Inficon IC-6000 thickness monitor. "D (filter)" is the actual coating thickness on the borosilicate substrate. "D (optical)" is the design thickness, measured in fractions of the design wavelength. "Rate" is the rate of deposition measured by the Inficon monitor in nanometers per second. "Oxygen pressure" is the partial pressure of oxygen admitted to the coating machine in units of $10^{-4}$ Torr. "Total pressure" is the total pressure within the coating machine in units of $10^{-4}$ Torr. $SiO_2$ is an abbreviation for silicon dioxide, and $TiO_2$ is an abbreviation for titanium dioxide.

In the Table, values for D (monitor), Rate, Oxygen Pressure, and Total Pressure are observed values. Values for N, D (optical), and D (filter) were obtained from a computer simulation. These values are believed to be accurate because the observed filter performance was consistent with the performance predicted by the computer simulation. The lower indices of refraction in layers 25 and 27 are the result of the lower deposition rates required to attain the extreme thinness of these layers.

Another high-index material that may be employed in place of titanium dioxide is zinc sulfide. Other possible low-index materials are magnesium fluoride, cryolite (but not with titanium dioxide), and thorium fluoride. These suggested alternate materials are intended as examples and by no means comprise an exhaustive list.

FIGS. 1 and 3 show the performance of this embodiment of the invention. As commented on above, the filter transmits a substantially higher percentage of blue light than its prior art counterparts while having high reflectance of infrared wavelengths.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

TABLE I

EXAMPLE COATING PARAMETERS

| Layer | Material | N | D (monitor) (nm) | D (filter) (nm) | D (optical) (wavelength) | Rate (nm/sec) | Oxygen Pressure ($10^{-4}$ Torr) | Total Pressure ($10^{-4}$ Torr) |
|---|---|---|---|---|---|---|---|---|
| (Top of Stack) | | | | | | | | |
| 1 | $SiO_2$ | 1.43 | 109.2 | 82.5 | 0.125 | 1.5 | 1.6 | 2.6 |
| 2 | $SiO_2$ | 1.48 | 219.1 | 165.5 | 0.25 | 1.5 | 1.6 | 2.6 |
| 3 | $TiO_2$ | 2.25 | 136.1 | 108.9 | 0.25 | 1.2 | 2.1 | 2.6 |
| 4 | $SiO_2$ | 1.48 | 219.1 | 165.5 | 0.25 | 1.5 | 1.6 | 2.6 |
| 5 | $TiO_2$ | 2.25 | 136.1 | 108.9 | 0.25 | 1.2 | 2.1 | 2.6 |
| 6 | $SiO_2$ | 1.48 | 219.1 | 165.5 | 0.25 | 1.5 | 1.6 | 2.6 |
| 7 | $TiO_2$ | 2.25 | 136.1 | 108.9 | 0.25 | 1.2 | 2.1 | 2.6 |
| 8 | $SiO_2$ | 1.48 | 219.1 | 165.5 | 0.25 | 1.5 | 1.6 | 2.6 |
| 9 | $TiO_2$ | 2.25 | 136.1 | 108.9 | 0.25 | 1.2 | 2.1 | 2.6 |
| 10 | $SiO_2$ | 1.48 | 219.1 | 165.5 | 0.25 | 1.5 | 1.6 | 2.6 |
| 11 | $TiO_2$ | 2.25 | 136.1 | 108.9 | 0.25 | 1.2 | 2.1 | 2.6 |
| 12 | $SiO_2$ | 1.48 | 219.1 | 165.5 | 0.25 | 1.5 | 1.6 | 2.6 |
| 13 | $TiO_2$ | 2.25 | 136.1 | 108.9 | 0.25 | 1.2 | 2.1 | 2.6 |
| 14 | $SiO_2$ | 1.48 | 219.1 | 165.5 | 0.25 | 1.5 | 1.6 | 2.6 |
| 15 | $TiO_2$ | 2.25 | 136.1 | 108.9 | 0.25 | 1.2 | 2.1 | 2.6 |
| 16 | $SiO_2$ | 1.48 | 219.1 | 165.5 | 0.25 | 1.5 | 1.6 | 2.6 |
| 17 | $TiO_2$ | 2.25 | 136.1 | 108.9 | 0.25 | 1.2 | 2.1 | 2.6 |
| 18 | $SiO_2$ | 1.48 | 219.1 | 165.5 | 0.25 | 1.5 | 1.6 | 2.6 |
| 19 | $TiO_2$ | 2.25 | 136.1 | 108.9 | 0.25 | 1.2 | 2.1 | 2.6 |

TABLE I-continued

EXAMPLE COATING PARAMETERS

| Layer | Material | N | D (monitor) (nm) | D (filter) (nm) | D (optical) (wavelength) | Rate (nm/sec) | Oxygen Pressure ($10^{-4}$ Torr) | Total Pressure ($10^{-4}$ Torr) |
|---|---|---|---|---|---|---|---|---|
| 20 | $SiO_2$ | 1.48 | 219.1 | 165.5 | 0.25 | 1.5 | 1.6 | 2.6 |
| 21 | $TiO_2$ | 2.25 | 136.1 | 108.9 | 0.25 | 1.2 | 2.1 | 2.6 |
| 22 | $SiO_2$ | 1.48 | 219.1 | 165.5 | 0.25 | 1.5 | 1.6 | 2.6 |
| 23 | $TiO_2$ | 2.25 | 136.1 | 108.9 | 0.25 | 1.2 | 2.1 | 2.6 |
| 24 | $SiO_2$ | 1.48 | 219.1 | 165.5 | 0.25 | 1.5 | 1.6 | 2.6 |
| 25 | $TiO_2$ | 2.10 | 7.9 | 6.3 | 0.015 | 0.2 | 2.1 | 2.6 |
| 26 | $SiO_2$ | 1.48 | 109.8 | 82.9 | 0.125 | 1.5 | 1.6 | 2.6 |
| 27 (Bottom of Stack) | $TiO_2$ | 2.10 | 7.9 | 6.3 | 0.015 | 0.2 | 2.1 | 2.6 |

What is claimed is:

1. A thin-film optical interference filter having high-transmission of blue light and high-reflectance of infrared light, said filter having a predetermined design wavelength, said filter comprising:
   (a) a glass substrate;
   (b) a first or bottom coating of a high-refractive index material applied on said substrate, said first coating having a first thickness of less than one-sixteenth of said design wavelength;
   (c) a second coating of a low-refractive index material applied on said first coating, said second coating having a second thickness greater than one-sixteenth and less than three-sixteenths of said design wavelength;
   (d) a third coating of a high-refractive index material applied on said second coating, said third coating having a third thickness of less than one-sixteenth of said design wavelength; and
   (e) a quarterwave stack applied on said third coating, said quarterwave stack including a plurality of layers of alternating high- and low-refractive index materials, said quarterwave stack having a design wavelength being matched approximately to said predetermined design wavelength of said filter.

2. An optical filter as described in claim 1 wherein said filter further includes a fourth coating of low-refractive index material applied on said quarterwave stack, said fourth coating having a thickness of less than one-quarter of said design wavelength.

3. An optical filter as described in claim 1 wherein said first and third coatings are formed from titanium dioxide and said second coating is formed from silicon dioxide.

4. An optical filter as described in claim 2 wherein said fourth coating is formed from silicon dioxide.

5. An optical filter as described in claim 1 wherein the thicknesses of said first and third coatings are each less than one thirty-second of said design wavelength and the thickness of said second coating is one-eighth of said design wavelength plus or minus one-tenth of one-eighth of said wavelength.

6. An optical filter as described in claim 2 wherein the thickness of said fourth coating is between approximately twenty-five percent to approximately sixty-seven percent of one-quarter of said design wavelength.

7. An optical filter as described in claim 1 wherein said design wavelength is approximately 880 nanometers.

* * * * *